(12) United States Patent
Takeyama

(10) Patent No.: US 10,811,705 B2
(45) Date of Patent: Oct. 20, 2020

(54) FUEL CELL MODULE

(71) Applicant: TOYOTA JIDOSHA KABUSHIKI KAISHA, Toyota-shi, Aichi-ken (JP)

(72) Inventor: Makoto Takeyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 231 days.

(21) Appl. No.: 16/156,412

(22) Filed: Oct. 10, 2018

(65) Prior Publication Data

US 2019/0115604 A1 Apr. 18, 2019

(30) Foreign Application Priority Data

Oct. 16, 2017 (JP) .................. 2017-200601

(51) Int. Cl.
| | | |
|---|---|---|
| *H01M 8/04111* | (2016.01) | |
| *H01M 8/04089* | (2016.01) | |
| *H01M 8/04014* | (2016.01) | |
| *H01M 8/04082* | (2016.01) | |
| *H01M 8/04007* | (2016.01) | |
| *H01M 8/04701* | (2016.01) | |
| *H01M 8/1018* | (2016.01) | |

(52) U.S. Cl.
CPC .... *H01M 8/04111* (2013.01); *H01M 8/04014* (2013.01); *H01M 8/04074* (2013.01); *H01M 8/04089* (2013.01); *H01M 8/04201* (2013.01); *H01M 8/04708* (2013.01); *H01M 2008/1095* (2013.01); *H01M 2250/20* (2013.01)

(58) Field of Classification Search
CPC ......... H01M 8/04014; H01M 8/04111; H01M 8/04074; H01M 8/04089; H01M 8/04201; H01M 8/04708
See application file for complete search history.

(56) References Cited

U.S. PATENT DOCUMENTS

| | | | |
|---|---|---|---|
| 2012/0028135 A1* | 2/2012 | Ohashi .................. | B60L 3/0053 |
| | | | 429/400 |
| 2017/0101031 A1* | 4/2017 | Ohashi ................ | B60L 11/1896 |
| 2019/0221876 A1* | 7/2019 | Matsumoto ....... | H01M 8/04014 |

FOREIGN PATENT DOCUMENTS

| | | |
|---|---|---|
| CN | 104659393 A | 5/2015 |
| JP | 2002-373687 | 12/2002 |
| JP | 2007-512679 A | 5/2007 |
| JP | 2010-212121 | 9/2010 |
| WO | WO2005-055341 A1 | 6/2005 |

OTHER PUBLICATIONS

Machine translation of JP 2010-212121 (no date).*

* cited by examiner

*Primary Examiner* — Amanda C. Walke
(74) *Attorney, Agent, or Firm* — Finnegan, Henderson, Farabow, Garrett & Dunner, LLP

(57) ABSTRACT

There is provided a fuel cell module that can surely suppress oscillation of a compressor, even when externally induced vibration becomes large in travelling on a rough road, for example, and that can thus provide high NV performance and reliability. In the fuel cell module, the compressor and an intercooler are coupled to a stack frame and are also rigidly coupled to each other.

6 Claims, 4 Drawing Sheets

FUEL CELL MODULE

CROSS REFERENCE TO RELATED APPLICATIONS

The present application claims priority from Japanese patent application JP 2017-200601 filed on Oct. 16, 2017, the content of which is hereby incorporated by reference into this application.

BACKGROUND

Technical Field

The present disclosure relates to a fuel cell module.

There have conventionally been known fuel cell systems that include fuel cells (a fuel cell stack) that generate electricity through electrochemical reactions of reactant gases, between an oxidant gas such as air and a fuel gas such as hydrogen.

In the fuel cell system of this type, an oxidant gas supply channel for supplying an oxidant gas to fuel cells is provided with an air cleaner, an air compressor (a turbo compressor; hereinafter also simply referred to as a compressor), an intercooler, and the like that are arranged in this order from the upstream side, and the compressor is adapted to compress the oxidant gas introduced via the air cleaner and pressure-feed the compressed oxidant gas to the intercooler. The compressor typically includes a compression chamber that is adapted to pressure-feed an oxidant gas containing oxygen and the like to the fuel cells. The compression chamber has disposed therein an impeller for compressing the oxidant gas, and a motor for rotationally driving the impeller is disposed in a position adjacent to the compression chamber, and such motor is housed in a motor room. When the compressor is driven in supplying an oxidant gas to the fuel cells, the motor for rotationally driving the impeller rotates at a high speed, which inevitably causes the main body of the compressor to vibrate.

Therefore, typically, in order to block the transmission of the vibration to a fastening body (a frame or the like) to which the compressor is attached, a rubber mount needs to be disposed between the compressor and the fastening body. However, since the compressor is secured to the fastening body via the rubber mount in such a case, the compressor tends to oscillate easily.

To address the aforementioned problem, JP 2010-212121 A, for example, proposes connecting the air compressor and the other peripheral components such as the intercooler using a rubber hose and further winding a metal plate around a part of the outer periphery of the rubber hose so as to ensure the oscillation absorbing function and rigidity. Further, JP 2002-373687 A proposes forming some of pipes for connecting the air compressor and the other peripheral components using highly rigid steel or the like so as to prevent generation of noise resulting from the vibration generated in the air compressor.

Background Art

However, when a vehicle with the aforementioned fuel cell system mounted thereon travels on a rough road, for example, externally induced vibration as well as self-generated vibration of the compressor acts on the vehicle. Therefore, in the background art described in JP 2010-212121 A and JP 2002-373687 A, the compressor may occasionally oscillate significantly due to such externally induced vibration.

The present disclosure has been made in view of the aforementioned problem, and provides a fuel cell module that can surely suppress the oscillation of a compressor, even when externally induced vibration becomes large in travelling on a rough road, for example, and that can thus provide high NV performance and reliability.

SUMMARY

In order to solve the aforementioned problem, according to the present disclosure, there is provided a fuel cell module that includes fuel cells mounted on a fuel cell stack frame, an air compressor adapted to pressure-feed an oxidant gas to the fuel cells, and an intercooler adapted to cool the oxidant gas that has been pressure-fed from the air compressor, in which the air compressor and the intercooler are coupled to the fuel cell stack frame and are also rigidly coupled to each other.

In some embodiments, a bracket adapted to secure one of the air compressor or the intercooler to the fuel cell stack frame is provided and an elastic member is interposed between the bracket and the one of the air compressor or the intercooler.

In some embodiments, a portion where the air compressor and the intercooler are coupled to each other is located at the lowest level in the gravity direction in a connecting channel that connects the air compressor and the intercooler.

In some embodiments, the air compressor and the intercooler are coupled to each other via triangle flanges with their corresponding vertices fastened together and one of the sides of each flange faces the fuel cell stack frame.

In some embodiments, the portion where the air compressor and the intercooler are coupled to each other and a portion where the bracket adapted to secure the air compressor to the fuel cell stack frame and the air compressor are coupled to each other are located on the opposite sides of the air compressor.

In some embodiments, the portion where the air compressor and the intercooler are coupled to each other and a portion where the bracket adapted to secure the intercooler to the fuel cell stack frame and the intercooler are coupled to each other are located on the opposite sides of the intercooler.

According to the present disclosure, since the air compressor and the intercooler are coupled to the fuel cell stack frame and are also rigidly coupled to each other, all of the air compressor, intercooler, and fuel cell stack frame are firmly integrated and the rigidity is improved. Therefore, the oscillation of the air compressor can be surely suppressed.

Further, there is another advantageous effect that since the elastic members are interposed between the bracket adapted to secure the air compressor to the fuel cell stack frame and the air compressor and between the bracket adapted to secure the intercooler to the fuel cell stack frame and the intercooler, vibrations generated in the air compressor and the intercooler are absorbed by their respective elastic members before being received by their respective brackets, and thus, the NV can be more suppressed and the durability of the brackets can be improved as compared to a case in which the elastic members are interposed between the brackets and the frame, for example.

DETAILED DESCRIPTION

Figure 1:
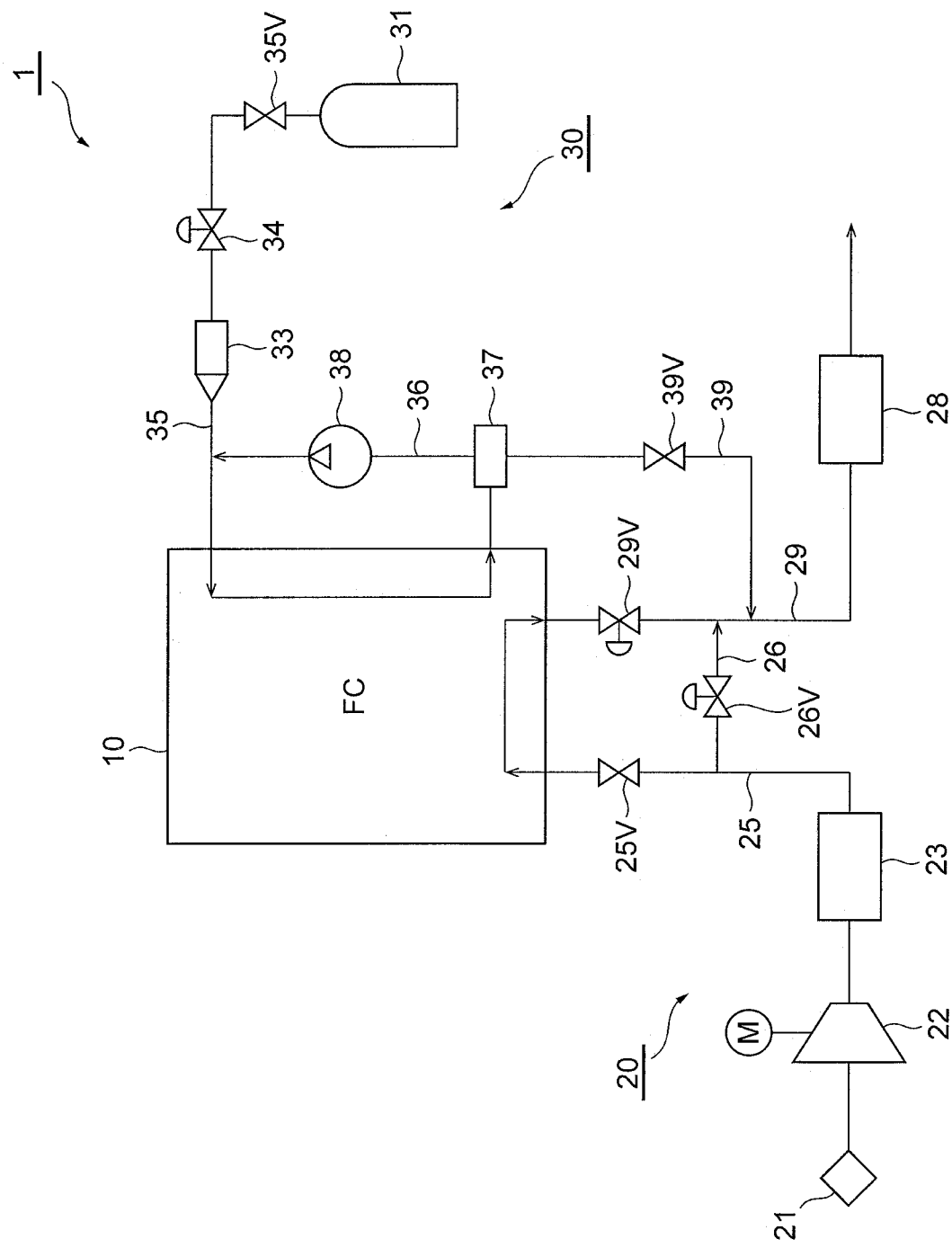
FIG. 1 is a system configuration diagram of a fuel cell system that includes a fuel cell module according to the present disclosure.

The configuration of the present disclosure will be described below in detail based on an example of an embodiment shown in the drawings. As an example of the present disclosure, fuel cells or a fuel cell system including them to be mounted on a fuel cell vehicle will be described, but the range of application of the present disclosure is not limited thereto.

First, the system configuration of a fuel cell system with a fuel module according to the present disclosure will be outlined with reference to FIG. 1.

A fuel cell system 1 shown in FIG. 1 includes, for example, fuel cells (a fuel cell stack) 10 formed by stacking a plurality of fuel cells, each cell being a unit cell, an oxidant gas supply system 20 that supplies an oxidant gas such as air to the fuel cells 10, and a fuel gas supply system 30 that supplies a fuel gas such as hydrogen to the fuel cells 10.

For example, each of the fuel cells 10 as a polymer electrolyte fuel cell has a membrane electrode assembly (MEA) that includes an electrolyte membrane with ion permeability and anode-side catalyst layer (anode electrode) and cathode-side catalyst layer (cathode electrode) sandwiching the electrolyte membrane therebetween. The MEA has gas diffusion layers (GDLs) on opposite sides thereof for providing a fuel gas or an oxidant gas to the MEA and for collecting electricity generated through electrochemical reactions. Such a membrane electrode assembly having GDLs on opposite sides thereof is referred to as a MEGA (Membrane Electrode & Gas Diffusion Layer Assembly), and the MEGA is sandwiched between a pair of separators. Herein, the MEGA is a power generation portion of the fuel cell. If no gas diffusion layers are provided, the MEA is the power generation portion of the fuel cell.

The oxidant gas supply system 20 includes, for example, an oxidant gas supply channel (pipe) 25 for supplying an oxidant gas to the fuel cells 10 (or the cathode electrodes thereof), an oxidant gas discharge channel (pipe) 29 for discharging, from the fuel cells 10, an oxidant off-gas that is produced after the oxidant gas is used for an electrochemical reaction in each fuel cell, and a bypass channel 26 for circulating the oxidant gas supplied through the oxidant gas supply channel 25 to the oxidant gas discharge channel 29 by bypassing the fuel cells 10. Each channel of the oxidant gas supply system 20 may be made of, for example, a rubber hose or a metal pipe.

The oxidant gas supply channel 25 is provided with an air cleaner 21, a compressor 22, an intercooler 23, and the like that are arranged in this order from the upstream side, and the oxidant gas discharge channel 29 is provided with a muffler 28 and the like. It should be noted that the oxidant gas supply channel 25 (or the air cleaner 21 thereof) is provided with, for example, an atmospheric pressure sensor and/or an air flow meter (which are not shown).

In the oxidant gas supply channel 25, the air cleaner 21 removes dust in the oxidant gas (such as air) to be taken in from the atmosphere.

The compressor 22 compresses the oxidant gas introduced via the air cleaner 21 and pressure-feeds the compressed oxidant gas to the intercooler 23.

When the oxidant gas that has been pressure-fed and introduced from the compressor 22 passes through the intercooler 23, the intercooler 23 cools the oxidant gas through heat exchange with a refrigerant, for example, and supplies the cooled oxidant gas to the fuel cells 10 (or the cathode electrodes thereof).

Further, the oxidant gas supply channel 25 is provided with an inlet valve 25V for blocking an oxidant gas flow between the intercooler 23 and the fuel cells 10. It should be noted that the inlet valve 25V may be a check valve that is configured to open by the flow of the oxidant gas moving from the intercooler 23 toward the fuel cells 10 and thus allow the passage of the oxidant gas, and to close by the flow of the oxidant gas moving from the fuel cells 10 toward the intercooler 23 and thus block the passage of the oxidant gas.

The bypass channel 26 is connected to the oxidant gas supply channel 25 (or the intercooler 23 thereof or the downstream of the intercooler 23) at one end thereof, and to the oxidant gas discharge channel 29 at the other end thereof. In other words, the bypass channel 26 branches from the oxidant gas supply channel 25 (or the intercooler 23 thereof or the downstream of the intercooler 23) toward the oxidant gas discharge channel 29 and is connected thereto. In the bypass channel 26, the oxidant gas that has been pressure-fed by the compressor 22, cooled by the intercooler 23, and then discharged flows toward the oxidant gas discharge channel 29 by bypassing the fuel cells 10. The bypass channel 26 is provided with a bypass valve 26V for regulating the flow rate of the oxidant gas flowing through the bypass channel 26 by blocking the oxidant gas flowing toward the oxidant gas discharge channel 29.

In the oxidant gas discharge channel 29, the muffler 28 separates the oxidant off-gas (exhaust gas) flowing through the oxidant gas discharge channel 29 into, for example, gas and liquid phases so as to be discharged to the outside.

Further, the oxidant gas discharge channel 29 is provided with a pressure regulating valve 29V for regulating the back pressure of the oxidant gas supplied to the fuel cells 10. The aforementioned bypass channel 26 is connected to the downstream side of the pressure regulating valve 29V.

Meanwhile, a fuel gas supply system 30 includes, for example, a fuel gas supply source 31 such as a hydrogen tank that stores a high-pressure fuel gas such as hydrogen, a fuel gas supply channel (pipe) 35 for supplying the fuel gas fed from the fuel gas supply source 31 to the fuel cells 10 (or the anode electrodes thereof), a circulation channel 36 for refluxing a fuel off-gas (unconsumed fuel gas) discharged from the fuel cells 10 to the fuel gas supply channel 35, and a fuel gas discharge channel (pipe) 39, which branches from the circulation channel 36, for discharging the fuel off-gas inside the circulation channel 36 to the outside (releasing to the air). Each channel of the fuel gas supply system 30 may be made of, for example, a rubber hose or a metal pipe.

The fuel gas supply channel 35 is provided with, for example, a pressure gauge (not shown) for measuring the fuel gas pressure, and also with a shut-off valve 35V for blocking the fuel gas flowing toward the fuel cells 10 by opening and closing the fuel gas supply channel 35, a regulator 34 for regulating (reducing) the pressure of the fuel gas flowing through the fuel gas supply channel 35, and an injector 33 for supplying the fuel gas with its pressure regulated to the fuel cells 10. When the shut-off valve 35V is opened, the high-pressure fuel gas stored in the fuel gas supply source 31 flows out to the fuel gas supply channel 35, and is supplied to the fuel cells 10 (or the anode electrodes thereof) with its pressure regulated (reduced) by the regulator 34 and the injector 33.

The circulation channel 36 is provided with a gas-liquid separator 37, a circulation pump (also referred to as a hydrogen pump) 38, and the like that are arranged in this order from the upstream side (the side of the fuel cells 10).

The gas-liquid separator 37 separates the fuel gas (such as hydrogen), which contains produced water therein, flowing through the circulation channel 36 into gas and liquid and stores them. A fuel gas discharge channel 39 is provided so as to branch from the gas-liquid separator 37.

The circulation pump 38 pressure-feeds the fuel off-gas, which has been produced through the gas-liquid separation by the gas-liquid separator 37, to the fuel gas supply channel 35 to be circulated therethrough.

The fuel gas discharge channel 39 is provided with a purge valve 39V that is adapted to open and close the fuel gas discharge channel 39 so as to discharge the produced water, which has been separated from the fuel gas by the gas-liquid separator 37, and some of the fuel off-gas discharged from the fuel cells 10.

The fuel off-gas discharged through the adjustment of opening and closing of the purge valve 39V of the fuel gas discharge channel 39 is mixed with the oxidant off-gas flowing through the oxidant gas discharge channel 29 and then released to the air outside via the muffler 28.

In the fuel cell system 1 with the aforementioned configuration, electricity is generated through electrochemical reactions between an oxidant gas such as air supplied to the fuel cells 10 (or the cathode electrodes thereof) through the oxidant gas supply system 20 and a fuel gas such as hydrogen supplied to the fuel cells 10 (or the anode electrodes thereof) through the fuel gas supply system 30.

Figure 2:
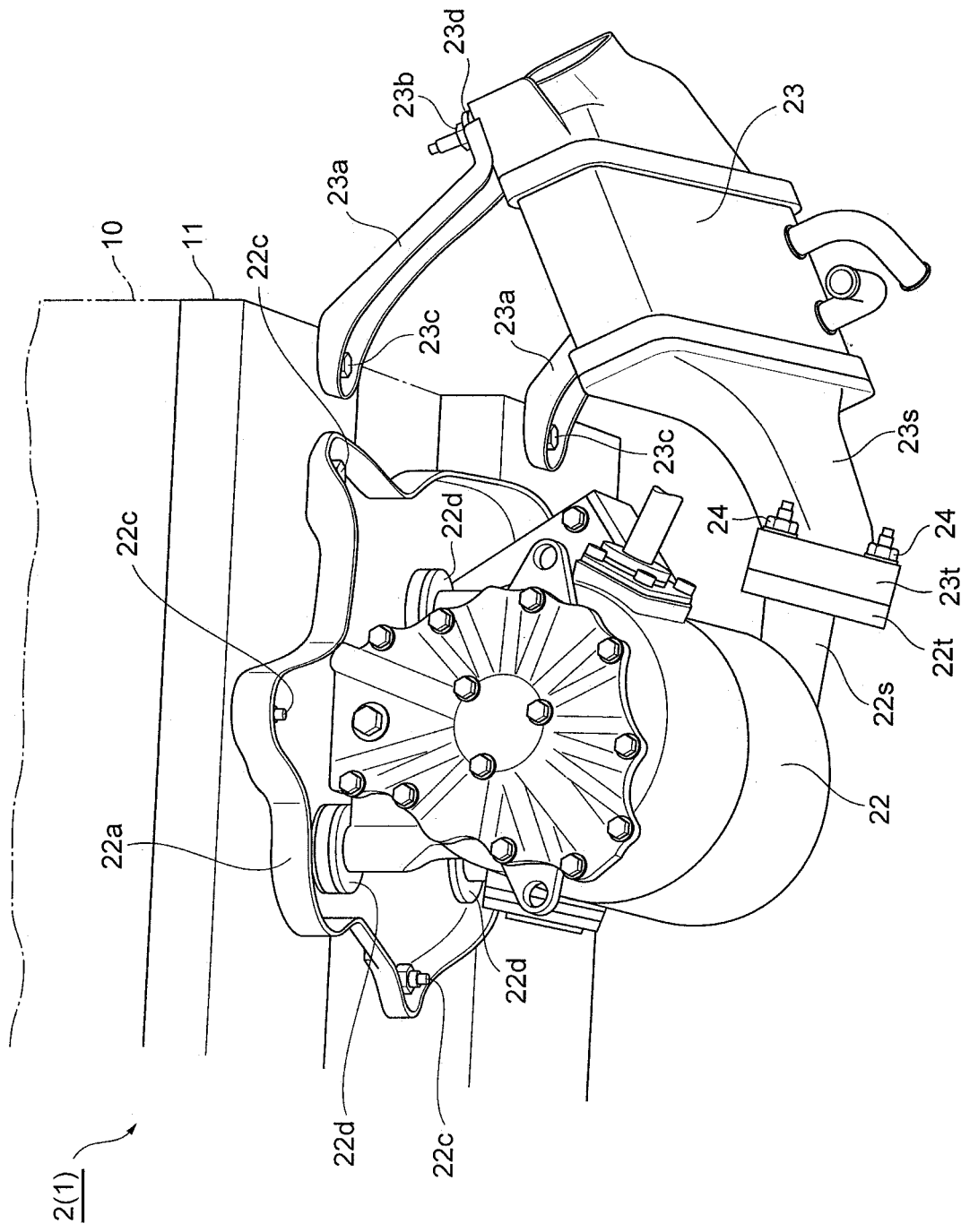
FIG. 2 is a perspective bottom view of the main portion of the fuel cell system that includes the fuel cell module according to the present disclosure.

FIG. 2 is a bottom view of the main portion of the fuel cell system including the fuel cell module according to the present disclosure.

The following description will be made with emphasis on the characteristic point of the present disclosure, which is the arrangement of the compressor 22 and intercooler 23.

The fuel cell module 2 of the fuel cell system 1 of the embodiment shown in the drawing mainly includes the fuel cells (the fuel cell stack) 10, and the compressor 22 and intercooler 23 that are disposed in the oxidant gas supply system 20 (or the oxidant gas supply channel 25 thereof).

The fuel cells 10 are fastened to a fuel cell stack frame (hereinafter simply referred to as a stack frame) 11, which is securely disposed on the front portion of a vehicle, for example, using fasteners (not shown) such as bolts, so as to be mounted thereon.

Meanwhile, the compressor 22 and intercooler 23 are arranged side by side below the stack frame 11. The compressor 22 is attached to the bottom surface of the stack frame 11 via a substantially plate-like ACP bracket 22a, and the intercooler 23 is attached to the bottom surface of the stack frame 11 via a pair of leg-like IC brackets 23a.

Specifically, an inner periphery portion (or a plurality of attachment portions provided thereon) of the ACP bracket 22a is attached to an upper portion (or a plurality of attachment portions provided thereon) of the compressor 22 via a plurality of fasteners (not shown) such as bolts, while an outer periphery portion (or a plurality of securing portions provided thereon) of the ACP bracket 22a is securely coupled to the bottom surface (or a plurality of securing portions provided thereon) of the stack frame 11 via a plurality of fasteners 22c such as bolts. In the present example, in order to block the transmission of the vibration generated in the compressor 22 to the stack frame 11 and the like through the ACP bracket 22a, ring-shaped rubber mounts (also referred to as rubber bushings) (elastic members) 22d made of an elastic material for absorption and prevention of the vibration are interposed between the ACP bracket 22a (or the attachment portions thereof) and the compressor 22 (or the attachment portions thereof).

Further, lower ends (or attachment portions provided thereon) of the pair of IC brackets 23a are attached to one side of the intercooler 23 (a side opposite to the side facing the compressor 22, that is, a side opposite to the side on which a connecting portion 23s (which will be described later) on the side of the intercooler 23 is provided; or a pair of attachment portions provided thereon) via fasteners 23b such as bolts, while upper ends (or securing portions provided thereon) of the pair of IC brackets 23a are securely coupled to the bottom surface (or a pair of securing portions provided thereon) of the stack frame 11 via fasteners 23c such as bolts. In the present example, in order to block the transmission of the vibration generated in the intercooler 23 to the stack frame 11 and the like through the IC brackets 23a, ring-shaped rubber mounts (elastic members) 23d made of an elastic material for absorption and prevention of the vibration are interposed between the IC brackets 23a (or the attachment portions thereof) and the intercooler 23 (or the attachment portions thereof).

Furthermore, in the present example, a connecting portion 22s that has a channel formed therein is provided such that it projects from a lower portion of the compressor 22 toward the intercooler 23, and the connecting portion 23s that has a channel formed therein is provided such that it projects from the other side of the intercooler 23 (the side opposite to the aforementioned side on which the attachment portions for attaching the IC brackets 23a to the intercooler 23 are provided) toward the compressor 22. In addition, the compressor 22 and intercooler 23 that are arranged side by side below the stack frame 11 are coupled to each other via the connecting portions 22s and 23s. It should be noted that a connecting channel that is formed inside the connecting portion 22s on the side of the compressor 22 and the connecting portion 23s on the side of the intercooler 23 through their connection forms a portion of the aforementioned oxidant gas supply channel of the oxidant gas supply system (see FIG. 4).

That is, in the present embodiment, a portion where the compressor 22 and the intercooler 23 are coupled to each other (that is, a flange 22t of the connecting portion 22s and a flange 23t of the connecting portion 23s) and a portion where the ACP bracket 22a and the compressor 22 are coupled to each other are located on the opposite sides of the compressor 22 (an angle equal to or greater than 90° is formed by two straight lines, one connecting the portion where the compressor 22 and the intercooler 23 are coupled to each other and the center of gravity of the compressor 22, and the other connecting the center of gravity of the compressor 22 and the portion where the ACP bracket 22a and the compressor 22 are coupled to each other). Further, the portion where the compressor 22 and the intercooler 23 are coupled to each other and a portion where the IC brackets 23a and the intercooler 23 are coupled to each other are located on the opposite sides of the intercooler 23 (an angle equal to or greater than 90° is formed by two straight lines, one connecting the portion where the compressor 22 and the intercooler 23 are coupled to each other and the center of gravity of the intercooler 23, and the other connecting the center of gravity of the intercooler 23 and the portion where the IC brackets 23a and the intercooler 23 are coupled to each other).

Figure 3:
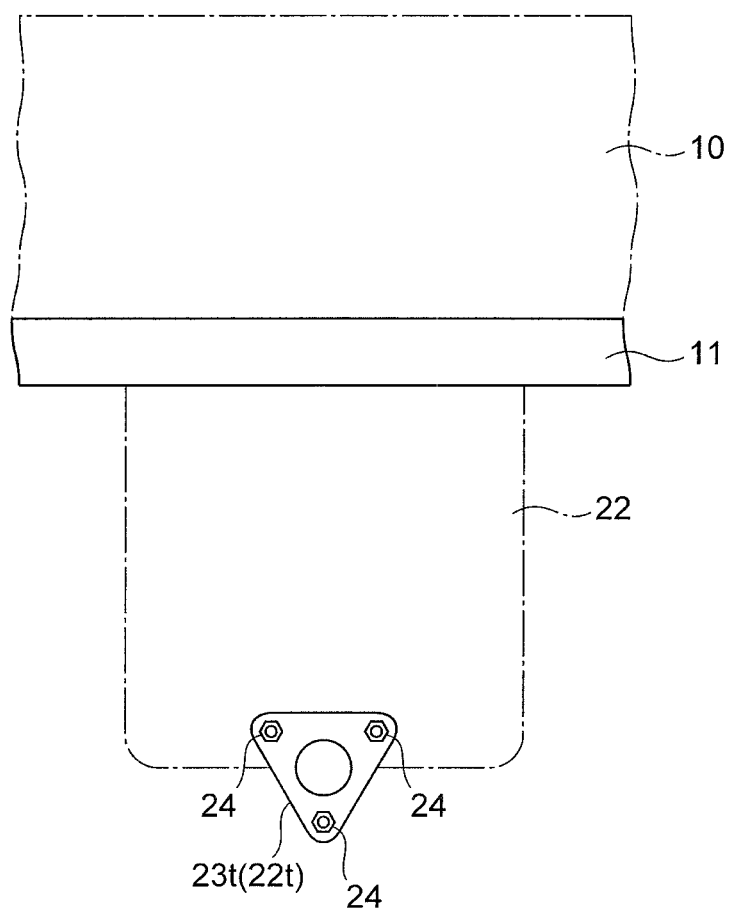
FIG. 3 is an enlarged side view of the main part of a portion where a compressor and an intercooler are coupled to each other in the fuel cell module of FIG. 2.

Specifically, as can be clearly understood from FIGS. 2 and 3, the triangle flange 22t and the triangle flange 23t are provided at a tip end of the connecting portion 22s on the side of the compressor 22 and a tip end of the connecting portion 23s on the side of the intercooler 23, respectively. Each of the flanges 22t and 23t is disposed such that one of the three sides of the flange is located on the upper side (that is, the side facing the stack frame 11) and one of the three vertices of the flange is located on the lower side (that is, the side opposite to the side facing the stack frame 11). The flanges 22t and 23t are made to abut each other with their corresponding vertices (or fastening portions provided thereon) fastened together using fasteners 24 such as bolts, so that the compressor 22 (or the connecting portion 22s thereof) and the intercooler 23 (or the connecting portion 23s thereof) are rigidly coupled together.

Figure 4:
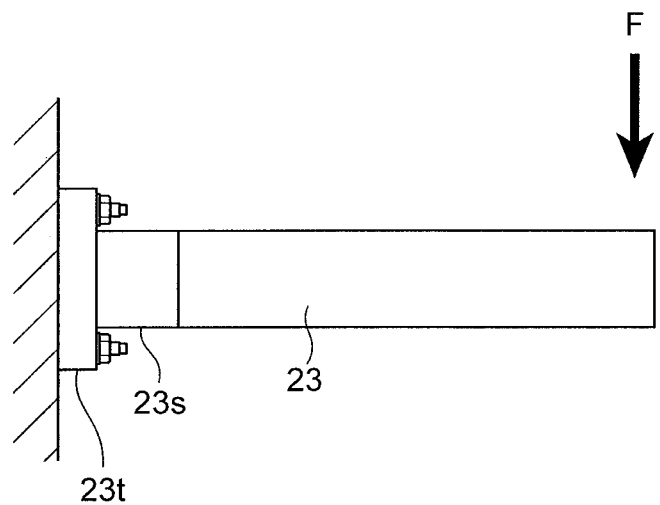
FIG. 4 is a view for illustration of the definition of rigid coupling.

Herein, as shown in FIG. 4 (which exemplarily illustrates the side of the intercooler 23), for example, the term "rigidly coupled" means the state of coupling in which a spring constant calculated from the amount of deformation obtained when force F is applied to one end of the intercooler 23 while the connecting portion 23s (or the flange 23t thereof) at the other end thereof is secured is equal to or greater than 0.5 kN/mm.

Further, in the present example, in order to make it difficult for liquid (water remaining after scavenging, remaining water from the fuel cells (the fuel cell stack) 10, water resulting from dew concentration, or the like) to enter the compressor 22 and the intercooler 23 in the connecting channel that connects the compressor 22 and the intercooler 23, the portion where the compressor 22 and the intercooler 23 are coupled to each other (that is, the flange 22t of the connecting portion 22s and the flange 23t of the connecting portion 23s) is located at the lowest level in the gravity direction in the connecting channel.

As described above, since the compressor 22 and the intercooler 23 in the fuel cell module 2 of the present embodiment are coupled to the stack frame 11 and are also rigidly coupled to each other, all of the compressor 22, intercooler 23, and stack frame 11 are firmly integrated and the rigidity is improved. Therefore, the oscillation of the compressor 22 can be surely suppressed, even when externally induced vibration becomes significant in traveling on a rough road, for example. Further, there is another advantageous effect that the resonance point of oscillations can be shifted through such rigid coupling, so that the durability is improved.

Further, there is yet another advantageous effect that since the rubber mount 22d is interposed between the ACP bracket 22a adapted to secure the compressor 22 to the stack frame 11 and the compressor 22, and the rubber mount 23d is interposed between the IC bracket 23a adapted to secure the intercooler 23 to the stack frame 11 and the intercooler 23, vibration generated in the compressor 22 and vibration generated in the intercooler 23 are respectively absorbed by the rubber mount 22d and the rubber mount 23d before being received by their respective brackets. Therefore, the NV can be more suppressed and the durability of the brackets can be improved as compared to a case in which elastic members are interposed between the brackets and the frame, for example.

Furthermore, in the present embodiment, since the portion where the compressor 22, and the intercooler 23 are coupled to each other is located at the lowest level in the gravity direction in the connecting channel that connects the compressor 22 and the intercooler 23, liquid (water remaining after scavenging, remaining water from the fuel cells (the fuel cell stack) 10, water resulting from dew concentration, or the like) tends to collect in the portion where the compressor 22 and the intercooler 23 are coupled to each other in the connecting channel, so that water is unlikely to remain in the compressor 22 in which the impeller rotates at a high speed or in the intercooler 23 with the narrow channel, and as a result, the compressor 22 and the intercooler 23 can be protected.

In addition, since the compressor 22 and the intercooler 23 are coupled via the triangle flanges 22t and 23t with their corresponding vertices fastened together and one of the three sides of each of the flanges 22t and 23t faces the stack frame 11 that is disposed on the upper side, the fasteners 24 such as bolts need not be disposed in a portion facing the stack frame 11 in the portion surrounded by the compressor 22, intercooler 23, and stack frame 11. Therefore, there is another advantageous effect of increased operability because a work space (for example, a space for the entry of a tool or the like for disposing the fasteners 24) can be easily secured.

Although the embodiment of the present disclosure has been described in detail with reference to the drawings, the specific configuration is not limited thereto, and any design changes that may occur within the spirit and scope of the present disclosure are all included in the present disclosure.

DESCRIPTION OF SYMBOLS

1 Fuel cell system
2 Fuel cell module
10 Fuel cells (fuel cell stack)
11 Stack frame (fuel cell stack frame)
22 Compressor (air compressor)
22a ACP bracket
22d Rubber mount (elastic member)
22s Connecting portion on side of compressor
22t Flange on side of compressor
23 Intercooler
23a IC bracket
23d Rubber mount (elastic member)
23s Connecting portion on side of intercooler
23t Flange on side of intercooler
24 Fastener

What is claimed is:

1. A fuel cell module comprising:
   a fuel cell mounted on a fuel cell stack frame;
   an air compressor adapted to pressure-feed an oxidant gas to the fuel cell; and
   an intercooler adapted to cool the oxidant gas that has been pressure-fed from the air compressor,
   wherein the air compressor and the intercooler are coupled to the fuel cell stack frame and are also rigidly coupled to each other.

2. The fuel cell module according to claim 1, further comprising a bracket adapted to secure one of the air compressor or the intercooler to the fuel cell stack frame,
   wherein an elastic member is interposed between the bracket and the one of the air compressor or the intercooler.

3. The fuel cell module according to claim 1, wherein a portion where the air compressor and the intercooler are coupled to each other is located at a lowest level in the gravity direction in a connecting channel that connects the air compressor and the intercooler.

4. The fuel cell module according to claim 1, wherein the air compressor and the intercooler are coupled to each other via triangle flanges with their corresponding vertices fastened together, and one of sides of each flange faces the fuel cell stack frame.

5. The fuel cell module according to claim 1, wherein a portion where the air compressor and the intercooler are coupled to each other and a portion where a bracket adapted to secure the air compressor to the fuel cell stack frame and the air compressor are coupled to each other are located on opposite sides of the air compressor.

6. The fuel cell module according to claim 1, wherein a portion where the air compressor and the intercooler are coupled to each other and a portion where a bracket adapted to secure the intercooler to the fuel cell stack frame and the intercooler are coupled to each other are located on opposite sides of the intercooler.

\* \* \* \* \*